July 23, 1940.  A. BRUNELLE  2,208,660
CYLINDER-TO-CRANKCASE ATTACHMENT
Filed Aug. 25, 1938
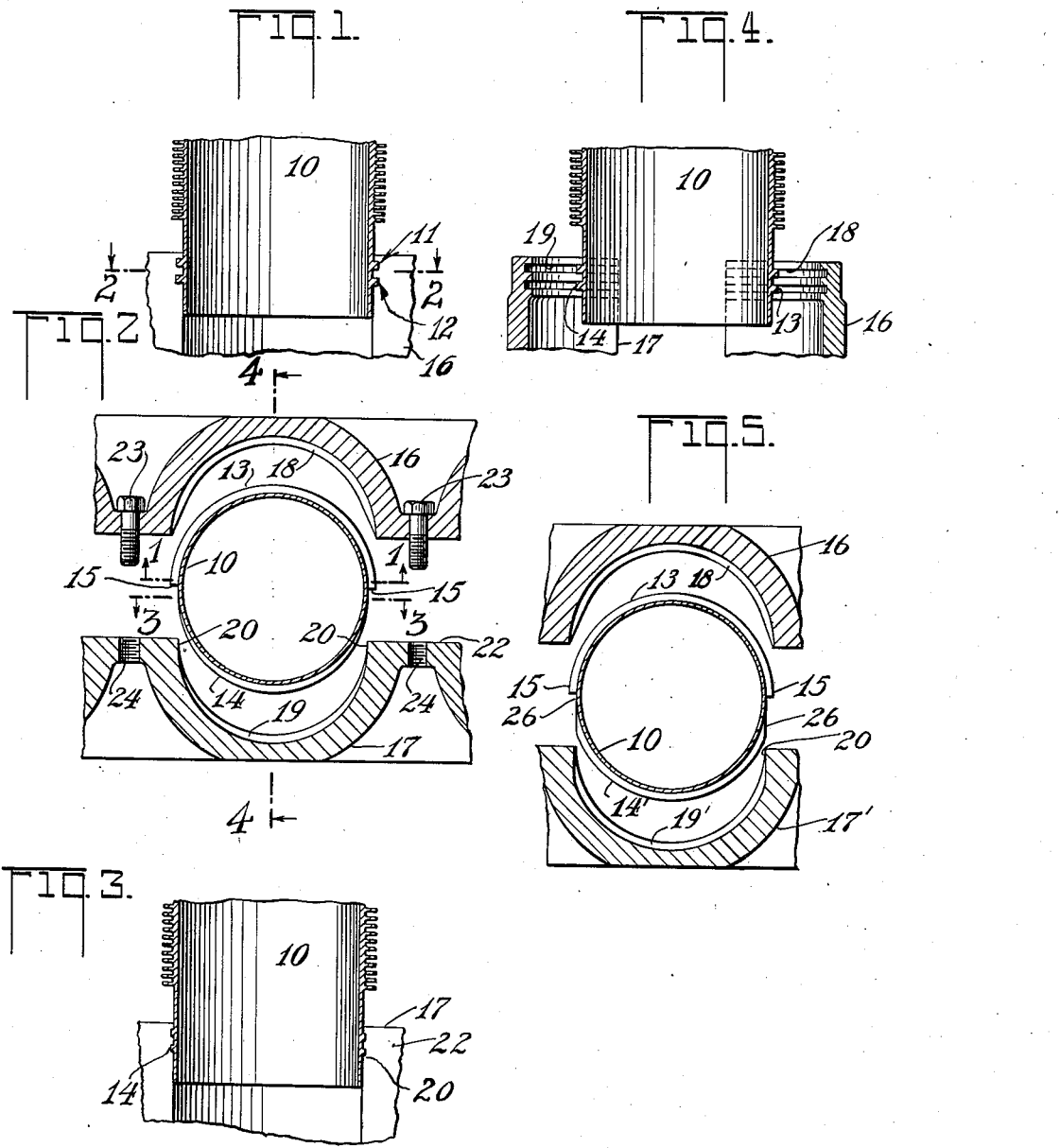
INVENTOR
AUGUST BRUNELLE
BY
ATTORNEY Patented July 23, 1940

2,208,660

UNITED STATES PATENT OFFICE 2,208,660

CYLINDER-TO-CRANKCASE ATTACHMENT

August Brunelle, Clifton, N. J., assignor to Wright Aeronautical Corporation, a corporation of New York Application August 25, 1938, Serial No. 226,677

3 Claims. (Cl. 285—129)

This invention relates to joints, being particularly concerned with a novel type of non-rotatable coupling between a cylindrical member and a split receptacle, the invention being particularly useful in connection with the mounting of internal combustion engine cylinders upon a split crankcase.

An object of the invention is to provide a cylinder-to-crankcase joint obviating the necessity for the conventional hold-down bolts passing through a flange in the cylinder and engaging openings in the crankcase deck. Still another object is to provide a joint wherein the cylinder will be supported substantially throughout its entire periphery upon the crankcase, a further object being to provide a joint which positively prevents relative rotation of the cylinder in the crankcase, and which will permit of disassembly of the cylinder from a split crankcase so arranged that the crankcase halves need be moved apart only a very small distance in order to allow withdrawal of the cylinder.

Further objects and advantages will be apparent from the annexed specification and claims, together with an examination of the accompanying drawing, in which:

Fig. 1 is a section through a cylinder indicating its relation to one-half of a split crankcase, being a section on the line 1—1 of Fig. 2;

Fig. 2 is a sectional plan of the assembly in disassembled relation, being a section on the line 2—2 of Fig. 1;

Figs. 3 and 4 are sections on the lines 3—3 and 4—4, respectively, of Fig. 2, and Fig. 5 is a sectional plan of an alternative arrangement of cylinder and crankcase parts.

In the figures, 10 represents a finned internal combustion engine cylinder having two sets of flanges 11 and 12 at its lower end. As will be seen in Fig. 2, each set of flanges comprises (1) a half flange 13 concentric with the cylinder and embracing 180° thereof, and (2) a half flange 14 embracing 180° of the cylinder and being of crescent shape in plan, the flanges at their ends becoming nil, while at their mid-portion they are of substantially the same radial depth as the flanges 13. Thus, there are provided shoulders 15 forming the ends of the flange parts 13. The crankcase or receptacle within which the cylinder is to be attached comprises opposed halves 16 and 17, the half 16 having grooves 18 therein to accommodate the flange parts 13. The crankcase half 17 is likewise provided with grooves 19 complementary in contour to the flange portions 14, whereby at points 20 close to the parting plane of the crankcase halves, the grooves wash out and the half bore within which the cylinder 10 fits is vertically smoothed. In assembling the parts, the cylinder is fitted to the crankcase half 16 with the shoulders 15 of the flanges 13 flush with the parting plane of the crankcase half. Thereupon, the crankcase half 17 is assembled so that its parting face contacts the parting face of the crankcase half 16, and so that the flanges 14 engage the grooves 19. When so assembled, the flange ends 15 engage the parting face 22 of the crankcase half 17, whereby no rotation of the cylinder 10 relative to the assembled crankcase may occur. The crankcase halves are attached to one another by any suitable means, cap screws 23 being shown, these cap screws passing through holes in the half 16 and being engageable with threaded openings 24 in the crankcase half 17.

In Fig. 5 an alternative arrangement is shown which has substantially the same effect as that previously described. The flanges 13 and grooves 18 are the same as in the first embodiment, but the flanges 14' are formed concentrically with the cylinder but are relieved as at 26 to form the flange ends 15 on the flanges 13. The relief mentioned would interrupt a portion of the circumference of the flange 14', the side faces formed by such relief being parallel. The grooves 19' in the crankcase 17' are concentric throughout most of their circumference, but, at their ends, the grooves are complemental in form to the end portions of the flange 14', providing the abutment 20 on the parting face of the crankcase half 17' against which the flange ends 15 of the flanges 13 may abut to prevent rotation of the cylinder 10 in the assembled crankcase when the crankcase halves are attached to one another at their parting faces, as previously described.

The above description has mentioned particularly cylinder and crankcase parts, but it is obvious that the same type of joint may be adapted to pipe or shaft couplings or any other mechanism where the construction might be appropriate.

If, for instance, a coupling of the character disclosed were to be used for parts to transmit rotary motion, the flange ends 15 could be disposed at corresponding ends of opposite flange portions to assist in effecting a unidirectional drive. That is, one end of the flange 14 might be formed with a shoulder 15, while the opposite end of the flange 13 might be relieved. Where the construction is to afford a firm lock against rotation in either direction, the arrangement disclosed would probably be preferred.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a mounting for a cylinder upon a split casing, a first concentric flange embracing only half of the cylinder periphery, the first of the casing halves having a groove complementary in shape to said flange within which the latter engages, a second flange coplanar with the first on the opposite side of the cylinder from the first flange and terminating short of the first flange ends, the second casing half having a groove complementary in shape to the second flange within which the latter engages, and means to attach said casing halves together around said cylinder, the ends of said first flange abutting upon the face of said second casing half to prevent the cylinder from turning in the case.

2. In a cylinder mounting, a cylindrical member having a semi-circular flange thereon and an opposite coplanar flange whose ends are tapered so as to blend with the cylinder wall at the ends of the first flange, the distance between the tapered sides of the opposite flange ends being at all times no greater than the cylinder diameter, and a split casing comprising halves each having a groove complementary to one of said flanges and adapted to be clamped around the cylinder and respective flanges.

3. In a cylinder mounting, a cylinder having a circumferential flange comprising a contiguous semi-circular portion whose ends are coplanar with the cylinder axis, and a second portion cut away adjacent its ends so that the maximum distance between the outer surfaces thereof is no greater than the cylinder diameter, and a split casing comprising two parts each having a semi-bore engaging the cylinder, one having an annular groove complementary in shape to the semi-circular flange portion, and the other having a groove complementary in shape to the cut away flange portion, the ends of the semi-circular flange abutting upon the parting surface of the opposite casing part, the flange-groove engagement holding the cylinder from axial displacement in the casing substantially throughout its periphery.

AUGUST BRUNELLE.